(12) United States Patent 
Poth

(10) Patent No.: US 12,668,312 B2 
(45) Date of Patent: Jun. 30, 2026

(54) ROOF FOR A MOTOR VEHICLE, IN PARTICULAR FOR A PASSENGER CAR, AND MOTOR VEHICLE

(71) Applicant: Bayerische Motoren Werke Aktiengesellschaft, Munich (DE)

(72) Inventor: Florian Poth, Otterfing (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 357 days.

(21) Appl. No.: 18/284,124

(22) PCT Filed: May 20, 2022

(86) PCT No.: PCT/EP2022/063700 
§ 371 (c)(1), 
(2) Date: Sep. 26, 2023

(87) PCT Pub. No.: WO2022/258347 
PCT Pub. Date: Dec. 15, 2022

(65) Prior Publication Data 
US 2024/0166266 A1 May 23, 2024

(30) Foreign Application Priority Data 
Jun. 10, 2021 (DE) ..................... 10 2021 115 015.9

(51) Int. Cl. 
B62D 25/07 (2006.01) 
(52) U.S. Cl. 
CPC .................................... B62D 25/07 (2013.01) 
(58) Field of Classification Search 
None 
See application file for complete search history.

(56) References Cited

U.S. PATENT DOCUMENTS

| | | | | |
|---|---|---|---|---|
| 2,991,120 A | * | 7/1961 | Barenyi | .................... B60R 9/04 |
| | | | | 296/213 |
| 4,355,843 A | * | 10/1982 | Murakami | ............. B62D 25/04 |
| | | | | 296/213 |

(Continued)

FOREIGN PATENT DOCUMENTS

| | | | | |
|---|---|---|---|---|
| CN | 201277397 Y | 7/2009 | | |
| DE | 3808244 A1 | * 9/1989 | ............. | B66F 9/072 |

(Continued)

OTHER PUBLICATIONS

English language translation of description (Year: 2016).*

(Continued)

*Primary Examiner* — Joseph D. Pape 
(74) *Attorney, Agent, or Firm* — Crowell & Moring LLP

(57) ABSTRACT

A roof for a motor vehicle has a roof opening at least partially delimited by a body part of a body of the motor vehicle. The root has a roof element which covers at least a portion of the roof opening, is transparent, is fixed at least indirectly to the body part and covers a water drainage opening, through which water can flow, of the body part at the top in the vertical direction of the vehicle. A discharge element is located beneath the body part in the vertical direction, the discharge channel of which discharge element is fluidically connected to the water drainage opening and therefore water flowing through the water drainage opening can flow therethrough.

10 Claims, 3 Drawing Sheets

(56)          References Cited

U.S. PATENT DOCUMENTS

| | | | | |
|---|---|---|---|---|
| 6,490,833 | B1 * | 12/2002 | Goto | B60J 10/82 |
| | | | | 52/302.1 |
| 7,578,549 | B2 * | 8/2009 | Betzl | B60J 7/0061 |
| | | | | 296/108 |
| 10,561,044 | B2 * | 2/2020 | Schmidt | H05K 7/20272 |
| 2003/0197401 | A1 | 10/2003 | de Gaillard | |
| 2006/0061145 | A1 | 3/2006 | Strebe et al. | |
| 2011/0254321 | A1 | 10/2011 | Moral et al. | |

FOREIGN PATENT DOCUMENTS

| | | | | |
|---|---|---|---|---|
| DE | 198 08 898 A1 | 9/1999 | | |
| DE | 199 56 567 A1 | 6/2001 | | |
| DE | 603 19 123 T2 | 2/2009 | | |
| DE | 102008063142 A1 * | 8/2009 | | B62D 25/07 |
| DE | 10 2008 051 701 A1 | 4/2010 | | |
| DE | 10 2010 055 637 A1 | 6/2012 | | |
| EP | 0295814 A2 * | 12/1988 | | B60J 7/0084 |
| FR | 3 032 510 A1 | 8/2016 | | |
| FR | 3032510 * | 8/2016 | | B62D 25/07 |
| JP | H0356098 B2 * | 8/1991 | | |
| KR | 20020044326 A * | 6/2002 | | |
| KR | 10-0880353 B1 | 1/2009 | | |
| KR | 10-2017-0042038 A | 4/2017 | | |
| WO | WO 03/018341 A1 | 3/2003 | | |

OTHER PUBLICATIONS

FR 3032510 English language translation of the description (Year: 2016).*
International Search Report (PCT/ISA/210) issued in PCT Application No. PCT/EP2022/063700 dated Aug. 25, 2022 with English translation (4 pages).
German-language Written Opinion (PCT/ISA/237) issued in PCT Application No. PCT/EP2022/063700 dated Aug. 25, 2022 with English translation (9 pages).
German-language Office Action issued in German Application No. 10 2021 115 015.9 dated Mar. 3, 2022 (7 pages).
English translation of Chinese-language Office Action issued in Chinese Application No. 202280021078.4 dated Oct. 29, 2025 (8 pages).

* cited by examiner

ROOF FOR A MOTOR VEHICLE, IN PARTICULAR FOR A PASSENGER CAR, AND MOTOR VEHICLE

BACKGROUND AND SUMMARY

The invention relates to a roof for a motor vehicle, in particular for a passenger vehicle. The invention also relates to a motor vehicle, in particular to a passenger vehicle.

DE 603 19 123 T2 discloses a roof-structured system for a vehicle, having a roof panel and a structure element connected to the roof panel. A vehicle having a closable roof opening can be seen from WO 03/018341 A1. In addition, DE 10 2008 051 701 A1 discloses a vehicle roof having a water channel and a panel.

The object of the present invention is to provide a roof for a motor vehicle, and also a motor vehicle having such a roof, such that it is possible to realize particularly advantageous properties of the roof.

This object is achieved according to the invention by a roof and by a motor vehicle having such a roof in accordance with the independent claims. Advantageous configurations of the invention form the subject matter of the dependent claims.

A first aspect of the invention relates to a roof for a motor vehicle designed preferably in the form of a passenger vehicle. This means that, in its completed state, the motor vehicle has the roof. The roof has a roof opening which is at least partially delimited by a bodywork component of the motor vehicle. The bodywork component is therefore a constituent part of the roof according to the invention, and the bodywork component is a constituent part of the motor-vehicle bodywork, which is also referred to as a superstructure and is preferably designed in the form of a self-supporting bodywork. For example, in the installed position of the roof, the roof opening is in each case at least partially, in particular at least predominantly or completely, delimited by the bodywork component toward the front or rear, as seen in the longitudinal direction of the vehicle, and/or toward the outside, as seen in the transverse direction of the vehicle. The roof assumes its installed position here in the completed state of the motor vehicle. For example, the bodywork component extends around the roof opening at least predominantly, and therefore at least by more than half or else completely, in the circumferential direction of the roof opening, this circumferential direction running in the vertical direction of the vehicle, so that the roof opening is at least predominantly, in particular completely, surrounded, and therefore delimited, by the bodywork component for example along the circumferential direction of the roof opening, this circumferential direction running around the vertical direction of the vehicle.

In order for it to be possible to realize particularly advantageous properties of the roof and therefore of the motor vehicle as a whole, the roof has, according to the invention, a light-permeable, that is to say transparent, roof element, which is formed separately from the bodywork component and covers over, and therefore closes, at least a sub-region of the roof opening. The roof opening is therefore covered over, and therefore closed, by the roof element at least partially, in particular at least predominantly and therefore by more than half or else completely. The feature whereby the roof element is light-permeable should be understood to mean that the roof element is permeable at least to light which is visible to the human eye. The roof element can be formed in one piece, or the roof element can have at least one roof part which is formed in one piece and is transparent, that is to say light-permeable. The roof element or the roof part can be formed from a light-permeable material, for example a light-permeable plastic or glass. The roof element is secured to the bodywork component at least indirectly, in particularly directly. This should be understood to mean that the roof element cannot be moved relative to the bodywork component. Since the roof element and also the roof opening are permeable to light which is visible to the human eye, light, for example sunlight, can pass through the roof element and roof opening from outside the motor vehicle and thus penetrate, or pass, into the interior space of the motor vehicle, the interior space being delimited or formed by the bodywork and also being referred to as the passenger compartment or passenger cell. For example, the roof element is adhesively bonded to the bodywork component, in particular directly. For example, the bodywork component has a flange, which is also referred to as a joining flange and extends at least part of the way, in particular at least most of the way or all the way, round in the circumferential direction of the roof opening. It is possible here for the roof element to be joined to the flange, in particularly directly, in particular such that the roof element is adhesively bonded for example to the flange and therefore to the bodywork component.

The bodywork component has at least one water-drainage opening, through which water can flow and which, in particular in relation to the installed position of the roof, is covered over, in particular completely, by the roof element toward the top, as seen in the vertical direction of the vehicle. Water which falls onto the roof from top to bottom, for example as seen in the vertical direction of the vehicle, can flow through for example between the bodywork component and the roof element and can flow toward the water-drainage opening and can then flow through the water-drainage opening, as a result of which the water is removed by means of the water-drainage opening, in particular from a region arranged between the roof element and the bodywork component. The invention therefore allows for particularly visually pleasing and high-quality removal of the water, which is for example rain or rainwater.

In order for it to be possible for the water to be removed particularly appropriately and specifically, the roof, according to the invention, also has a removal element, which is formed separately from the roof element and separately from the bodywork component and, in particular in relation to the installed position of the roof, is arranged beneath the bodywork component, as seen in the vertical direction of the vehicle, and therefore is at least partially, in particular at least predominantly or completely, overlapped, and thus covered over, by the roof element toward the top, as seen in the vertical direction of the vehicle. The removal element has a removal channel, which is connected fluidically to the water-drainage opening and therefore through which the water which flows through the water-drainage opening can flow. The water which flows through the water-drainage opening can be guided in a specific and appropriate manner by means of the removal channel, in particular to an exit opening, via which for example the water which flows through at least the water-drainage opening and then the removal channel can flow out of the removal channel and, for example, to an area surrounding the motor vehicle. It is possible here, for example, for the removal channel to be connected fluidically to the exit opening, which opens out for example onto or into the surrounding area. The exit opening is formed or delimited for example by a second component, in particular a second bodywork component, wherein the second component is formed for example separately from the roof element, separately from the first bodywork component and separately from the removal element. Whenever the following text refers to the bodywork component, this should be understood—unless specified to the contrary—to be the first bodywork component, which has, or forms or delimits, the water-drainage opening.

In particular, it is contemplated for the transparent roof element to be at least partially, in particular at least predominantly or completely, enclosed by the bodywork component along its circumferential direction, which runs around the vertical direction of the vehicle and coincides with the circumferential direction of the roof opening, so that the roof element is overlapped by the bodywork element toward the rear, as seen in the longitudinal direction of the vehicle, toward the front, as seen in the longitudinal direction of the vehicle, and toward the outside on both sides, as seen in the transverse direction of the vehicle. This means that the roof element is embedded in a visually pleasing and high-quality manner in the bodywork component. The bodywork component is formed, for example, in a light-impermeable manner, therefore from a light-impermeable material. For example, the material from which the bodywork component is formed is a metallic material. In particular, the bodywork component can be in one piece, or the bodywork component can have a plurality of components, which are formed separately from one another and are connected to one another.

In the case of a particularly advantageous embodiment of the invention, provision is made for a wall region which belongs to the removal element and extends all the way round the water-drainage opening in the circumferential direction of the water-drainage opening to butt, in particular directly and therefore with sealing action, against an underside of the bodywork component, the underside being directed away from the roof element, in particular against a second wall region of the underside, the second wall region extending all the way round the water-drainage opening in the circumferential direction of the water-drainage opening. This means that the water which flows through the water-drainage opening can particularly advantageously flow to the, and into the, removal channel without being able to flow through between the underside and the removal element. In other words, excessive and undesirable leakages can thus be avoided.

In order for it to be possible for the water to be particularly advantageously removed, in particular from the abovedescribed region, provision is made, in a further configuration of the invention, for the water-drainage opening to be arranged in a recess in an upwardly oriented upper side, as seen in the vertical direction of the vehicle. The recess should be understood to mean that the recess extends downward or that a base of the recess is set back toward the bottom, as seen in the vertical direction of the vehicle, in relation to an upper-side surface region which adjoins the recess, in particular upward, as seen in the vertical direction of the vehicle, in the direction away from the underside. Provision is made here, in particular, for the water-drainage opening to be arranged at the lowermost point of the recess, as seen toward the bottom in the vertical direction of the vehicle. This means that water which falls onto the roof can flow, in particular purely under the action of gravitational force, into the recess and to the water-drainage opening and can thus be particularly advantageously removed.

A further embodiment is distinguished in that, at least in a length region of the removal element, the removal element is designed in the form of a folding bellows which delimits at least part of the removal channel, in particular directly.

The folding bellows can ensure that the removal element interacts in a particularly sealed manner with the bodywork component, in particular with the underside. In particular, the folding bellows can compensate for production-induced and possibly unavoidable tolerances, in particular distance tolerances, so that advantageous sealing between the removal element and the bodywork component, in particular the underside, can be ensured. This means that the water can be removed from the region with particular precision.

In a further, particularly advantageous configuration of the invention, the aforementioned wall region of the removal element is formed by the folding bellows. This can ensure that the wall region of the removal element advantageously butts against the underside all the way round, in particular over a large surface area and in particular in the circumferential direction of the water-drainage opening, so that undesirable leakages can be avoided.

A further embodiment is distinguished in that a sub-region of the bodywork-delimited interior space of the motor vehicle, the interior space also being referred to as a passenger cell or passenger compartment, is overlapped by the removal element toward the top, as seen in the vertical direction of the vehicle. This can straightforwardly provide for effective, specific and appropriate removal of the water.

In order for it to be possible for the water to be removed from the region in a particularly specific and appropriate manner, provision is made, in a further configuration of the invention, for the removal channel of the removal element to run through the bodywork-delimited interior space of the motor vehicle. It is, in particular, conceivable here for the removal channel or the removal element to be covered over, and therefore concealed, in the direction of the interior space, in particular completely, by a trim-panel element, for example by a roofliner, so that the removal element is not visible to persons situated in the interior space. It is the case here that for example the removal element or the removal channel is to be arranged, in particular as seen in the vertical direction of the vehicle, between the bodywork component and the interior space itself, in which persons can be situated while the motor vehicle is traveling.

In order for it to be possible to realize particularly straightforward and appropriate channeling of the water, provision is made, in a further configuration of the invention, for the removal channel to run through the bodywork-delimited interior space of the motor vehicle. As an alternative, or in addition, it is contemplated for a further channel, which is connected fluidically to the removal channel and therefore through which the water which flows through the removal channel can flow, to run through the bodywork-delimited interior space of the motor vehicle. It is also contemplated for the removal channel and/or the further channel to run within a further bodywork component, which is formed separately from the bodywork component and is connected at least indirectly to the bodywork component, as a result of which it is possible to provide for appropriate and specific channeling of the water.

Finally, it has been found to be particularly advantageous if the further removal channel is formed, in particular delimited directly, by a line element, wherein the line element is formed in one piece with the removal element or the line element is formed separately from the removal element and is connected mechanically, and preferably also fluidically, to the removal element. The fluidic connection of the line element to the removal element should be understood to mean that the further removal channel is connected fluidically to the removal channel of the line element. This means that the water can be removed from the region to particularly good effect.

A second aspect of the invention relates to a motor vehicle which is designed preferably in the form of a passenger vehicle and has a roof according to the first aspect of the invention. Advantages and advantageous configurations of the first aspect of the invention are considered to be advantages and advantageous configurations of the second aspect of the invention, and vice versa.

Further details of the invention can be gathered from the following description of a preferred exemplary embodiment with the associated drawings.

BRIEF DESCRIPTION OF THE DRAWINGS

In the figures, identical or functionally identical elements are provided with identical reference signs.

DETAILED DESCRIPTION OF THE DRAWINGS

Figure 1:
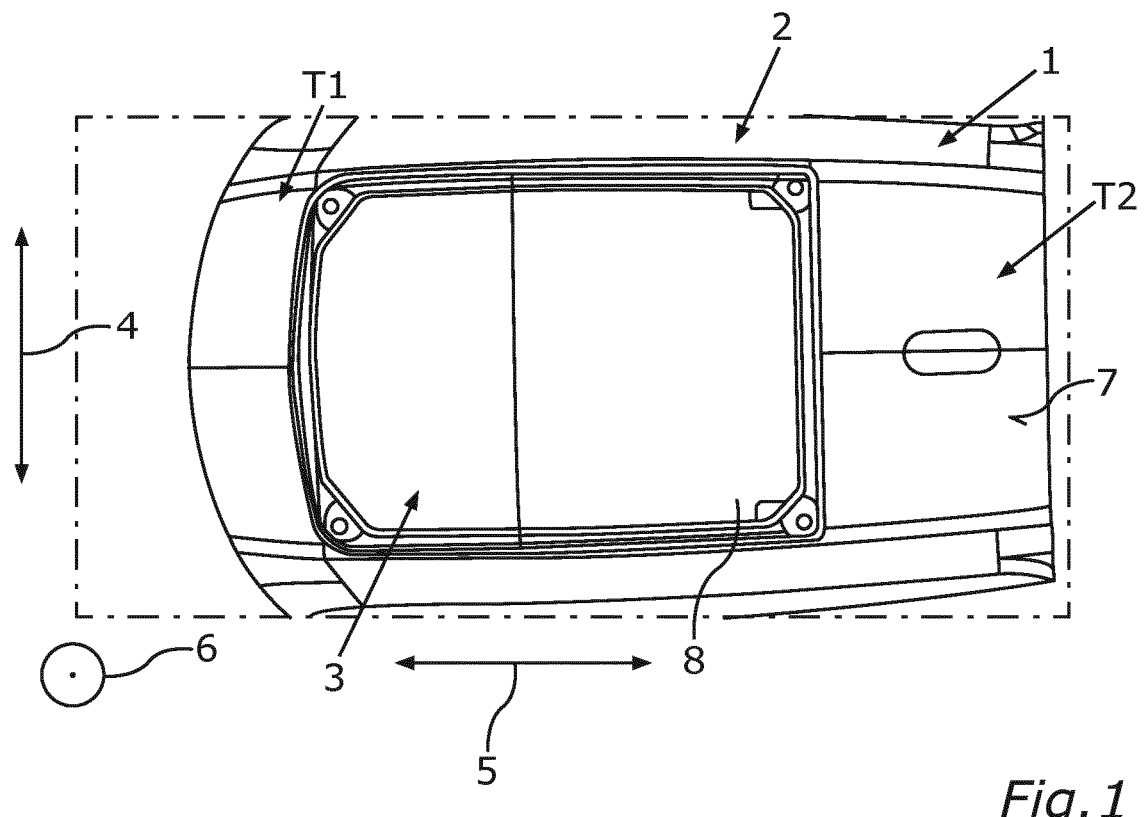
FIG. 1 is a schematic plan view of a roof for a motor vehicle.

FIG. 1 shows a schematic plan view of a roof 1 for a motor vehicle which is designed preferably in the form of a passenger vehicle. This means that, in its completed state, the motor vehicle has the roof 1. It is also the case that, in its completed state, the motor vehicle comprises a bodywork, which is also referred to as a superstructure and, in the case of the exemplary embodiment shown in FIG. 1, is designed in the form of a self-supporting bodywork. The bodywork forms or delimits an interior space of the motor vehicle, the interior space also being referred to as a passenger compartment or passenger cell, wherein persons can be situated in the interior space while the motor vehicle is traveling. In particular, in the completed state of the passenger vehicle, the interior space is delimited by the roof 1 at least partially, in particular at least predominantly and therefore by more than half or else completely, toward the top, as seen in the vertical direction of the vehicle. The bodywork has, for example, a base, which is also referred to as a main base and by means of which the interior space is at least partially, in particular at least predominantly or completely, delimited toward the bottom, as seen in the vertical direction of the vehicle.

The roof 1 has a light-impermeable bodywork component 2, which has, that is to say delimits, a roof opening 3. It can be seen from FIG. 1 that the roof opening 3 is delimited all the way round by the bodywork component 2 in the circumferential direction of the roof opening 3, of which the circumferential direction extends about the vertical direction of the vehicle, so that the roof opening 3 is delimited, in each case completely, by the bodywork component 2 on both sides as seen in the transverse direction of the vehicle and on both sides as seen in the longitudinal direction of the vehicle. In FIG. 1, the transverse direction of the vehicle is depicted by a double arrow 4, whereas the longitudinal direction of the vehicle is depicted by a double arrow 5. The vertical direction of the vehicle is depicted by a double arrow 6.

The bodywork component 2 can be formed in one piece or the bodywork component 2 has a plurality of components, which are formed separately from one another and are connected to one another. At least one or more sub-regions T1 and T2 of the bodywork component 2 can form respective parts of an outer skin panel 7 of the roof 1, it being possible, in the completed state of the motor vehicle, for the outer skin panel 7 of the roof to be visually and haptically perceptible to persons situated in an area surrounding the passenger vehicle. Therefore, for example further bodywork components, which are formed in particular separately from the bodywork component 2 and are connected to the bodywork component 2 at least indirectly, in particular directly, are each at least partially covered over, and therefore concealed, by the sub-regions T1 and T2 in the outward direction, that is to say in the direction of the area surrounding the passenger vehicle. In particular, the feature whereby the bodywork component 2 is a constituent part of the bodywork can be understood to mean that, in the completed state of the motor vehicle, the bodywork component 2 has been fixed to the rest of the bodywork.

The roof 1 has a light-permeable, and therefore transparent, roof element 8, by means of which the roof opening 3 is completely covered over and therefore closed. For example, the roof element 8 is inserted into the roof opening 3, in the present case such that the roof element 8 is embedded in the bodywork component 2. This means, in particular, that the roof element 8 is completely surrounded by the bodywork component 2 along the circumferential direction of the roof element, this circumferential direction coinciding with the circumferential direction of the roof opening 3 and running around the vertical direction of the vehicle, so that the roof element 8 is overlapped by the bodywork component 2 on both sides as seen in the transverse direction of the vehicle and also on both sides as seen in the longitudinal direction of the vehicle.

Figure 2:
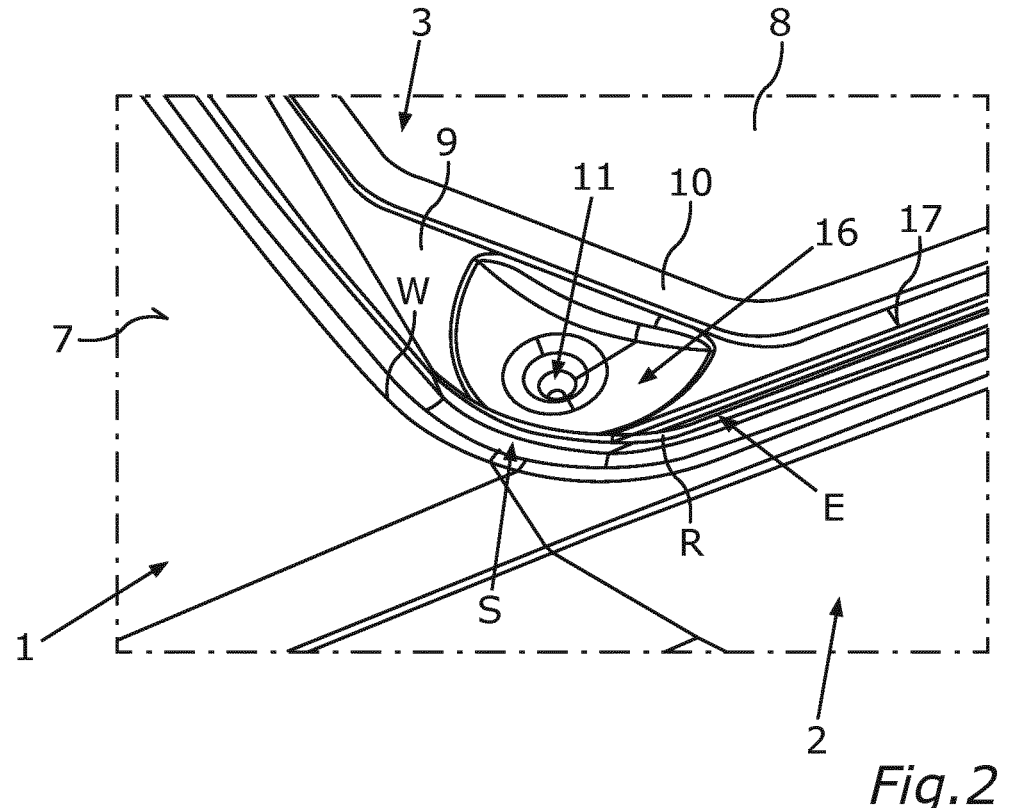
FIG. 2 shows, in detail form, a schematic and perspective plan view of the roof.
Figure 3:
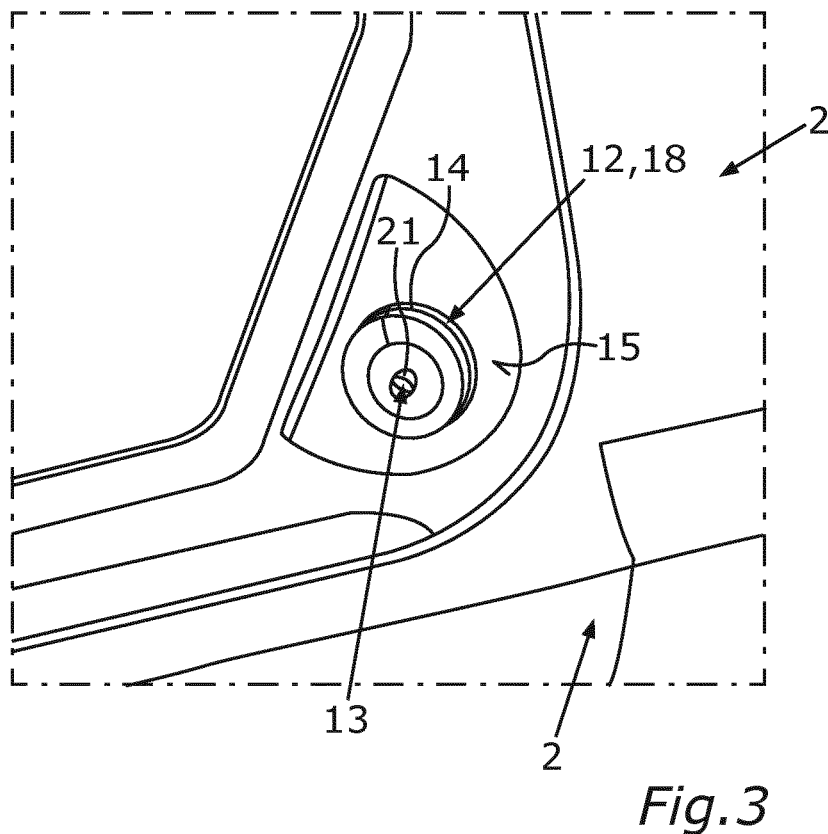
FIG. 3 shows, in detail form, a schematic and perspective bottom view of the roof.
Figure 4:
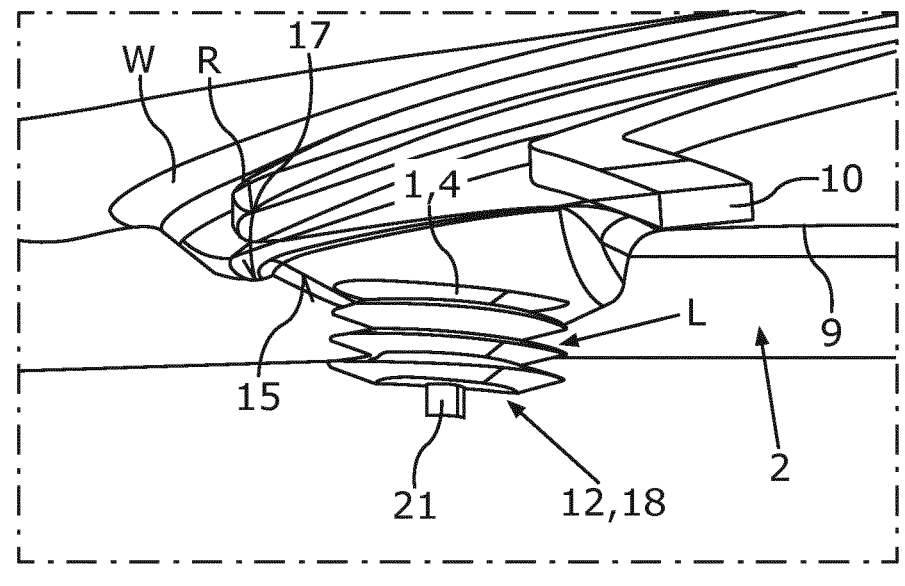
FIG. 4 shows, in detail form, a schematic and sectional perspective view of the roof.

It can be seen to particularly good effect in combination with FIG. 2 that the bodywork component 2 has a flange 9, which is also referred to as a joining flange and extends all the way around the roof opening 3 for example in the circumferential direction of the roof opening 3. The roof element 8 here is connected to the flange 9 and is therefore secured to the flange 9 and thus to the bodywork component 2, so that, in the completed state of the passenger vehicle, the roof element 8 cannot be moved relative to the bodywork component 2. In the case of the exemplary embodiment shown in the figures, the roof element 8 is adhesively bonded to the flange 9 and thus to the bodywork component 2. Provided for this purpose is a glue bead 10, which is arranged on the flange 9 and extends along the flange 9 such that the glue bead extends all the way around the roof opening 3 in the circumferential direction of the roof opening 3. The glue bead 10 therefore adhesively bonds the roof element 8 to the flange 9, and thus to the bodywork component 2, in particular it sticks the roof element to the flange 9, all the way round. The roof element 8 is preferably formed in one piece. For example, the roof element 8 is formed from glass, so that the roof element 8 can be a glass panel.

It can be seen to particularly good effect from FIG. 2 that a surrounding edge R of the roof element 8, which terminates at its edge R, is spaced apart from a surrounding wall region W of the bodywork component 2, wherein the wall region W completely encloses the edge region R, and therefore the roof element 8, in the circumferential direction of the roof element 8 such that the edge region R is overlapped by the wall region W of the bodywork component 2 on both sides as seen in the transverse direction of the vehicle and also on both sides as seen in the longitudinal direction of the vehicle. This means that the roof element 8 is embedded in the bodywork component 2. Since the edge region R is spaced apart from the wall region W, a gap S is arranged between the edge region R and the wall region W, this gap being delimited, in particular directly in each case, on the one hand, for example, by the wall region W and on the other hand by the edge region R. It is conceivable for an in particular surrounding sealing element to be arranged in the gap S, the sealing element butting for example on the one hand against the roof element 8, in particular directly, and on the other hand against the wall region W, in particularly directly. For example, the sealing element is retained in the roof element 8. The sealing element is provided as an option and can be omitted. However, the sealing element is designed, for example, merely in the form of a dust seal, which prevents relatively large particles, such as particle of dust, from penetrating between the wall region W and the edge region R, but the sealing element cannot prevent water, for example rain, which falls onto the roof 1 from flowing through between the wall region W and the edge region R. The glue bead 10 seals the roof element 8 in relation to the bodywork component 2, so that water which flows through between the wall region W and the edge region R cannot overcome the glue bead 10 and therefore cannot flow into the interior space. However, the glue bead 10 is set back in relation to the edge region R, and in relation to the wall region W, toward the inside as seen in the transverse direction of the vehicle and toward the inside as seen in the longitudinal direction of the vehicle, so that water which falls onto the roof 1 can flow through between the wall region W and the edge region R and can therefore flow beneath the roof element 8 and between the roof element 8 and the bodywork component 2 as far as the glue bead 10. Put in yet another way, water which falls onto the roof can flow through between the wall region W and the edge region R and therefore pass into a region which is arranged between the roof element 8 and the bodywork component 2, as seen in the vertical direction of the vehicle, and is for example delimited by the roof element 8 toward the top, as seen in the vertical direction of the vehicle, and by the bodywork component 2 toward the bottom, as seen in the vertical direction of the vehicle, although the aforementioned region is arranged further toward the inside than the sealing element and further toward the outside than the glue bead 10, as seen in the longitudinal direction of the vehicle and in the transverse direction of the vehicle.

In order for it to be possible, then, for water to be particularly advantageously removed from the aforementioned region, the bodywork component 2 has at least one water-drainage opening 11. In the case of the exemplary embodiment shown in the figures, the water-drainage opening 11 is arranged in a corner region E of the bodywork component 2. The water-drainage opening opens out into the region in such a way that the water which passes into the region can flow to the water-drainage opening 11 and then can flow through the water-drainage opening 11. This means that the water can be removed from the region by means of the water-drainage opening 11.

It is also the case that the roof 1—as can be seen to particularly good effect from FIGS. 3 to 6—has a removal element 12, which is formed separately from the bodywork component 2 and separately from the roof element 8 and has, or in particular directly delimits or forms, a removal channel

13. The removal channel 13 is connected fluidically to the water-drainage opening 11, which is also referred to in simple terms as a drainage opening, so that the water which flows through the water-drainage opening 11 can flow through the removal channel 13. This means that the water can flow out of the region first of all into, and through, the water-drainage opening 11, and the water can then flow out of the water-drainage opening 11 and can flow into the removal channel 13 and through the removal channel 13, as a result of which the water can be removed in a specific and appropriate manner.

In order to avoid excessive leakages, a wall region 14 which belongs to the removal element 12 and extends all the way around the water-drainage opening 11 in the circumferential direction of the water-drainage opening 11 butts directly, and therefore with sealing action, against an underside 15 of the bodywork component 2, the underside being oriented downward, as seen in the vertical direction of the vehicle, and therefore being directed away from the roof element 8, the abutment being, in particular, such that the wall region 14 butts directly, and therefore with sealing action, against a region of the underside 15 which extends all the way around the water-drainage opening 11 in circumferential direction of the water-drainage opening 11.

In order for it to be possible for the water to be removed to particularly good effect, the water-drainage opening 11 is arranged in a recess 16, which extends from top to bottom, as seen in the vertical direction of the vehicle, and is located in an upper side 17 of the bodywork component 2, the upper side being oriented toward the top, as seen in the vertical direction of the vehicle, and therefore being directed away from the removal element 12 and also away from the underside 15, the arrangement being, in particular, such that the water-drainage opening 11 is arranged at the lowermost point of the recess 16, as seen from top to bottom in the vertical direction of the vehicle. It can also be seen to particularly good effect from FIGS. 1, 2 and 4 that the water-drainage opening 11 is completely overlapped, and therefore covered over, by the roof element 8 toward the top, as seen in the vertical direction of the vehicle. Moreover, it is also the case that the recess 16 is completely overlapped, and therefore covered over, by the roof element 8 toward the top, as seen in the vertical direction of the vehicle.

In order for it to be possible to avoid excessive leakages between the removal element 12 and the bodywork component 2, it is the case that, at least in a length region L of the removal element 12, the removal element 12 is designed in the form of a folding bellows 18, wherein the folding bellows 18 forms, or in particular directly delimits, at least part of the removal channel 13. The wall region 14 which belongs to the removal element 12 and butts directly against the underside 15 is formed here by the folding bellows 18. It is therefore possible for the wall region 14, and thus the folding bellows 18, to be pushed against the underside 15 to particularly good effect, and therefore with sealing action, and—as will be explained in precise terms hereinbelow—to be fastened beneath the bodywork component 2, as seen in the vertical direction of the vehicle, so that for example tolerances can be compensated for and the removal element 12 can advantageously be sealed in relation to the underside 15.

Figure 5:
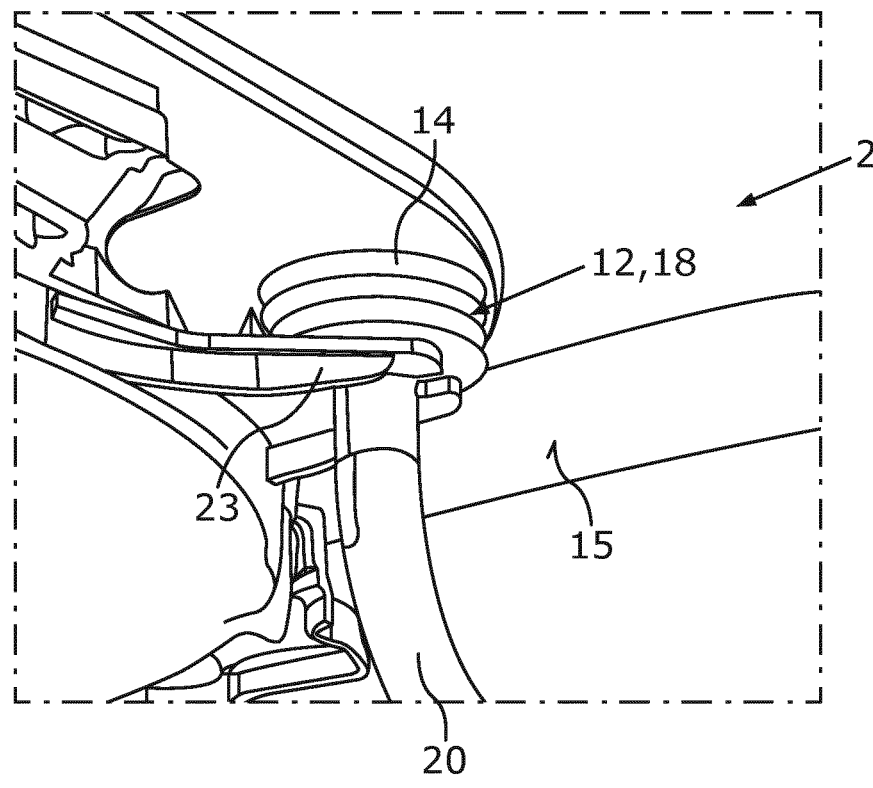
FIG. 5 shows, in detail form, a further schematic and perspective bottom view of the roof.
Figure 6:
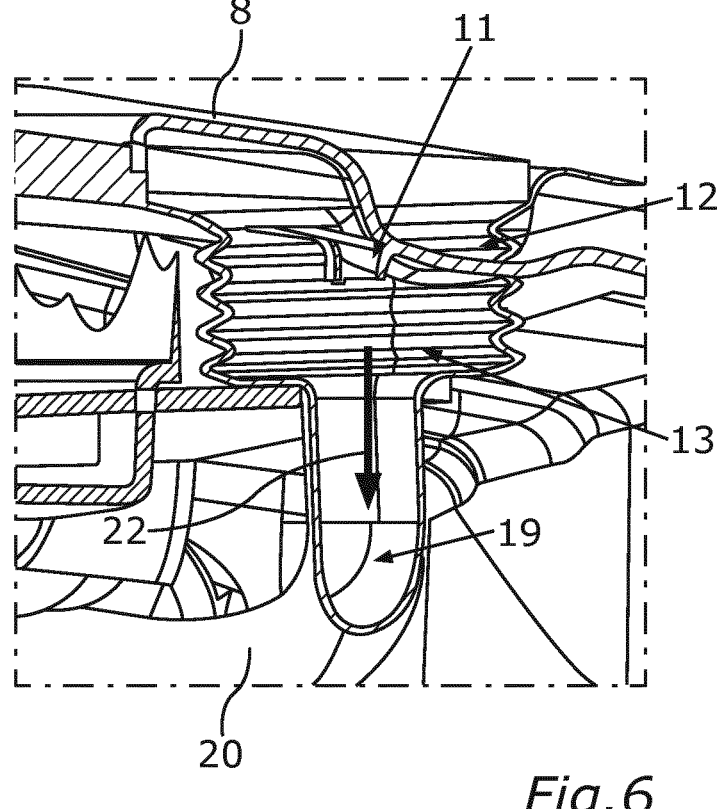
FIG. 6 shows, in detail form, a further schematic sectional view of the roof.

As can be seen in combination with FIGS. 5 and 6, a further channel 19, through which the water which flows through the water-drainage opening 11 and the removal channel 13 can flow, is connected fluidically to the removal channel 13 and, via this, to the water-drainage opening 11. The further channel 19 is delimited, in particular directly, by a line element 20, wherein the line element 20 can be formed in one piece with the removal element 12. As an alternative, it is conceivable for the line element 20 to be formed separately from the removal element 12 and be connected mechanically to the removal element 12 such that the further channel 19 is connected fluidically to the removal channel 13. For this purpose, for example—as can be seen to particularly good effect from FIGS. 3 and 4—the removal element 12 has a connection stub 21, which is also referred to simply as a stub and to which the line element 20 can be connected at least mechanically and preferably also such that the further channel 19 is connected fluidically to the removal channel 13. At least part of the removal channel 13 is formed here, in particular directly delimited, by the connection stub 21. For example, the line element 20 can be connected to the removal element 12 mechanically, and preferably also fluidically, such that the line element 20 is, or has been, fitted onto the connection stud 21.

It can be seen from FIGS. 5 and 6 that the line element 20, and therefore the further channel 19, can run through the interior space and/or through a further component of the bodywork, in order thus for it to be possible to realize particularly appropriate, specific and straightforward channeling of the water out of the region. For example, at least a sub-region of the interior space is overlapped or covered over by the removal element 12 and/or the line element 20 toward the top, as seen in the vertical direction of the vehicle. It is, in particular, conceivable here for a trim-panel element, designed for example in the form of a roofliner, to be arranged between the interior space, or the sub-region of the interior space, and the removal element 12 and the line element 20, the trim-panel element covering over, and therefore concealing, the removal element 12 and the line element 20 in the direction of the actual interior space. This means that the removal element 12 and the line element 20 are not visible to persons situated in the interior space.

In the case of a method for producing the roof 1, it is the case that, in relation to the installed position of the roof 1, the removal element 12 is moved from bottom to top relative to the bodywork component 2, as seen in the vertical direction of the vehicle, such that the removal element 12, in particular the folding bellows 18 and quite particularly the wall region 14, is brought into direct abutment with the underside 15. There is no need for the removal element 12 to be arranged on the upper side 17 from the top or for the removal element 12 to be fitted through the bodywork component 2.

Retention or fastening of the removal element 12 relative to the bodywork component 2 can be seen to particularly good effect from FIG. 5. As can be seen from FIG. 5, a retaining element 23, also referred to as a fastening element, is arranged beneath the bodywork component 2, as seen in the vertical direction of the vehicle, and is at least partially, in particular at least predominantly, or completely, over-lapped, and therefore covered over, by the bodywork component 2 toward the top, as seen in the vertical direction of the vehicle. For example, the retaining element 23 is formed separately from the bodywork component 2 and is retained on the bodywork component 2 at least indirectly, in particular directly. The removal element 12 is retained on the retaining element 23 and therefore retained or fixed relative to the bodywork component 2 via the retaining element 23. For example, the removal element 12 is fitted into the retaining element 23 and thereby retained on the retaining element 23, that is to say connected to the retaining element 23. The folding bellows 18 is arranged between the retaining element 23 and the underside 15, as seen in particular in the vertical direction of the vehicle. It is possible here for the folding bellows 18 to compensate for production-induced or manufacturing-induced tolerances in a distance, running in particular in the vertical direction of the vehicle, between the retaining element 23 and the underside 15, so that, even if such tolerances occur, it can be ensured that the removal element 12, in particular the folding bellows 18 and quite particularly the wall region 14, butts/butt against the under-side 15 over a large surface area and therefore with sealing action. This means that excessive leakages can be avoided.

In FIG. 6, an arrow 22 depicts the water which flows through the water-drainage opening 11 and flows from the water-drainage opening 11 into the removal channel 13, flows through the removal channel 13 and, from this, into the further channel 19 and then flows through the further channel 19. This can straightforwadly provide for particularly advantageous, appropriate and specific removal of the water.

LIST OF REFERENCE SIGNS 1 roof
2 bodywork component
3 roof opening
4 double arrow
5 double arrow
6 double arrow
7 outer skin panel
8 roof element
9 flange
10 glue bead
11 water-drainage opening
12 removal element
13 removal channel
14 wall region
15 underside
16 recess
17 upper side
18 folding bellows
19 further channel
20 line element
21 connection stub
22 arrow
23 retaining element
E corner region
L length region
R edge region
S gap
T1 sub-region
T2 sub-region
W wall region

The invention claimed is:

1. A roof for a motor vehicle, comprising:
   a component of a motor-vehicle bodywork at least partially delimiting a roof opening;
   a light-permeable roof element, which covers at least a sub-region of the roof opening, is secured at least indirectly to the bodywork component and by which a water-drainage opening, which is located in the bodywork component and through which water is flowable, is covered over toward the top, as seen in a vertical direction of the vehicle;
   a removal element, which is arranged beneath the bodywork component, as seen in the vertical direction, the removal element having a removal channel that is connected fluidically to the water-drainage opening and therefore through which flows the water flowable through the water-drainage opening; and a retaining element arranged beneath the bodywork component, as seen in the vertical direction, the retaining element being formed separately from the bodywork component and the removal element, wherein the removal element is retained on the retaining element.

2. The roof according to claim 1, wherein a wall region of the removal element that extends all around the water-drainage opening in a circumferential direction of the water-drainage opening abuts against an underside of the bodywork component, the underside being directed away from the roof element.

3. The roof according to claim 1, wherein the water-drainage opening is arranged in a recess in an upwardly oriented upper side of the bodywork component, as seen in the vertical direction.

4. The roof according to claim 1, wherein at least in a length region, the removal element is in the form of a folding bellows which delimits at least part of the removal channel.

5. The roof according to claim 4, wherein a wall region of the removal element is formed by the folding bellows.

6. The roof according to claim 1, wherein a sub-region of a bodywork-delimited interior space of the motor vehicle is overlapped by the removal element toward the top, as seen in the vertical direction.

7. The roof according to claim 6, wherein the removal channel runs through the bodywork-delimited interior space of the motor vehicle.

8. The roof according to claim 1, wherein the removal channel and/or a further channel, through which the water flowing through the removal channel can flow, runs through a bodywork-delimited interior space of the motor vehicle or runs within a further bodywork component, which is formed separately from the bodywork component and is connected at least indirectly to the bodywork component.

9. The roof according to claim 8, wherein the further channel is formed by a line element, which is in one piece with the removal element or is formed separately from the removal element and is connected with the removal element.

10. A motor vehicle comprising the roof according to claim 1.

* * * * *